United States Patent [19]
Buckley et al.

[11] Patent Number: 4,785,683
[45] Date of Patent: Nov. 22, 1988

[54] HAND OPERATED BRAKE ACTUATOR

[75] Inventors: James A. V. Buckley, Whitefish Bay; Donald D. Brown, Thiensville, both of Wis.

[73] Assignee: Hayes Industrial Brake, Inc., Mequon, Wis.

[21] Appl. No.: 71,409

[22] Filed: Jul. 9, 1987

[51] Int. Cl.⁴ .................... G05G 9/00; G05G 5/06; F16D 65/30
[52] U.S. Cl. .................... 74/489; 74/471 R; 74/534; 74/502.2; 188/24.16; 188/24.18; 188/82.34; 188/204 R
[58] Field of Search ............. 74/471 R, 489, 501 B, 74/534; 180/210; 188/24.16, 24.18, 82.34, 204 R

[56] References Cited

U.S. PATENT DOCUMENTS

| | | | |
|---|---|---|---|
| 1,389,717 | 9/1921 | Babo | 188/204 R X |
| 1,532,868 | 4/1925 | Blackburn | 74/534 |
| 3,059,490 | 10/1962 | McDuffie | 74/534 X |
| 3,800,618 | 4/1974 | Yoshigai | 74/489 |
| 4,448,436 | 5/1984 | Ohzono | 180/210 X |
| 4,566,667 | 1/1986 | Yanagisawa | 74/534 X |

FOREIGN PATENT DOCUMENTS

| | | | |
|---|---|---|---|
| 710299 | 9/1941 | Fed. Rep. of Germany | 188/204 R |
| 711500 | 10/1941 | Fed. Rep. of Germany | 188/204 R |
| 219331 | 5/1942 | Switzerland | 188/24.18 |
| 447441 | 12/1935 | United Kingdom | 188/204 R |

*Primary Examiner*—Allan D. Herrmann
*Attorney, Agent, or Firm*—Ronald E. Barry

[57] ABSTRACT

A brake actuator for an all-terrain vehicle, the actuator including a housing and a cover, a hand-operated lever arm pivotally mounted in the housing and projecting outwardly from the housing through said cover, the lever arm being operatively connected to the brake cables for the wheels, a locking segment mounted for pivotal movement in the housing, a ratchet-type cam surface on the segment, the segment being biased to move into locking engagement with the lever arm, the ratchet-type cam surface being spaced at progressively greater distances from the pivot axis to block the lever arm at increasing distances from the brakes.

9 Claims, 3 Drawing Sheets

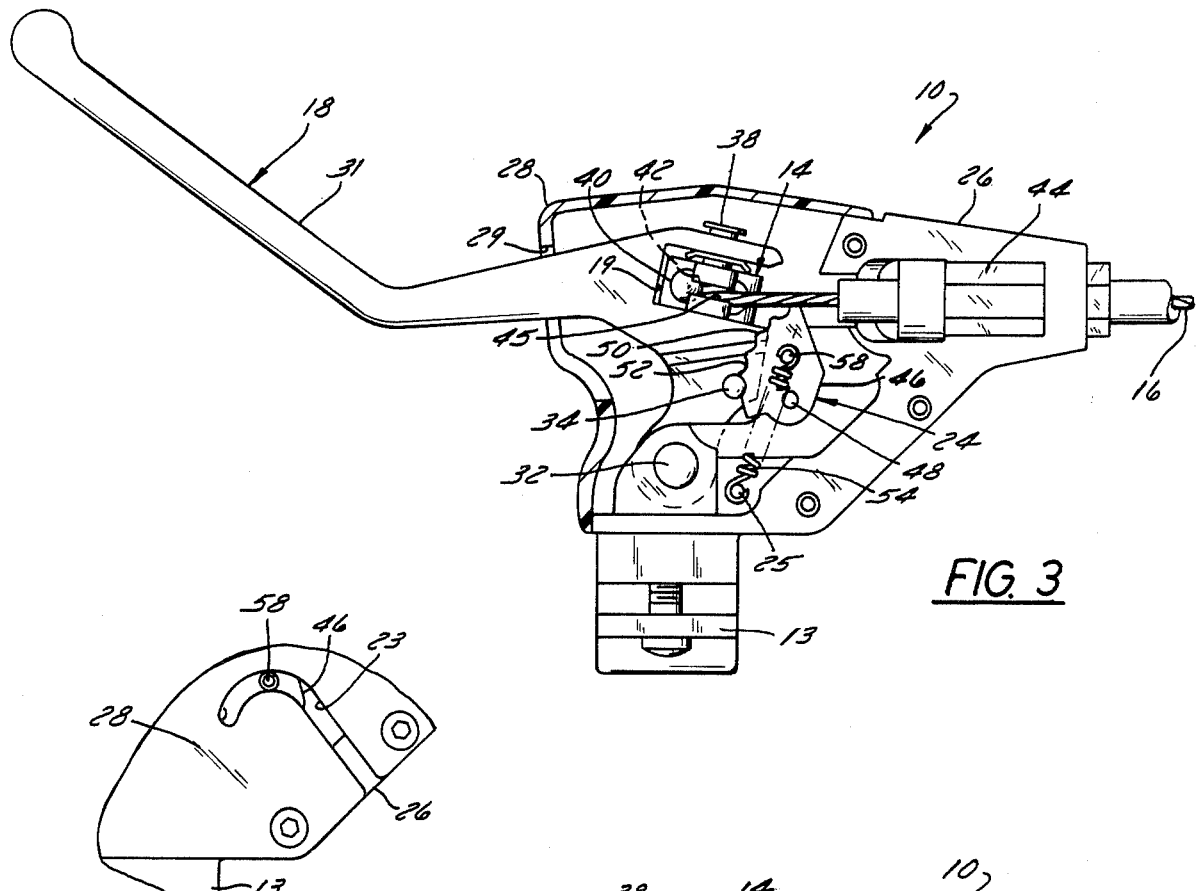
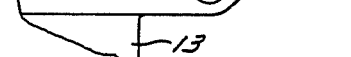
FIG. 5
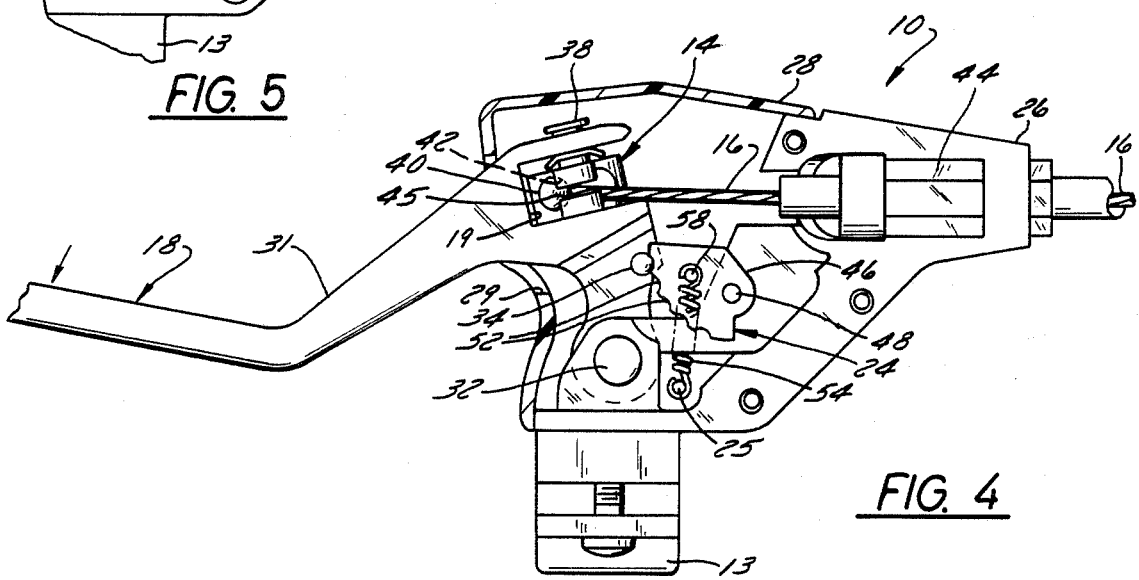
FIG. 4

HAND OPERATED BRAKE ACTUATOR

BACKGROUND OF THE INVENTION

Hand-operated brake actuators are commonly provided on the handle bars of the wheel vehicles such as all terrain vehicles (ATV). Such actuators are operated by the driver by squeezing or pushing a lever toward the handle bar. Brake actuators of this type generally are not provided with any means to set the brakes in a locked position. It has been determined that it is desirable in some instances to lock the brakes while the vehicle is stopped for loading or unloading. Where locks have been provided, they have either been separated from the actuator or incorporated into the actuator in the form of a two-position stop or latch lock. Such devices can be accidentally released by bumping the lever which will trip the lock to release the brake. The rear wheel brakes are generally connected to the brake actuator by a single cable. If the cable breaks, both of the rear brakes will be released allowing the vehicle to move.

SUMMARY OF THE INVENTION

The lever actuated brake, according to the present invention, includes a housing adapted to be mounted on a handle bar. A lever arm is pivotally mounted in the housing and is operatively connected to the two cables for the vehicle brakes by a cable equalizer. A cam segment is provided in the housing for locking the lever arm in a locking position. One of the primary features of the invention is the provision of a series of grooves in the form of a ratchet on the curved surface of the cam segment. The grooves are located at progressively greater distances from the pivot axis of the cam segment so that the lever arm can be locked at progressively greater distances from the brakes depending on the amount of play in the cables and the strength of the operator.

A further feature of the invention is the provision of an over center spring which is used to bias the cam segment in the locked and unlocked positions so that the brake cannot be inadvertently released if someone should accidentally push down on the lever when in the locked position and cannot be inadvertently locked when set in the unlocked position.

A still further feature of the invention is the inclusion of a cable equalizer which maintains tension on one brake cable if the other cable breaks.

Other principal features and advantages of the invention will become apparent to those skilled in the art upon review of the following detailed description, claims and drawings.

DESCRIPTION OF THE DRAWINGS

FIG. 3 is a side elevation of the brake actuator showing the lever arm locked in one of the locking positions.

FIG. 4 is a view similar to FIG. 3 showing the lever arm locked in the last locking position.

FIG. 5 is a view of a portion of the housing cover showing the groove for the actuator pin on the lock segment.

Figure 1:
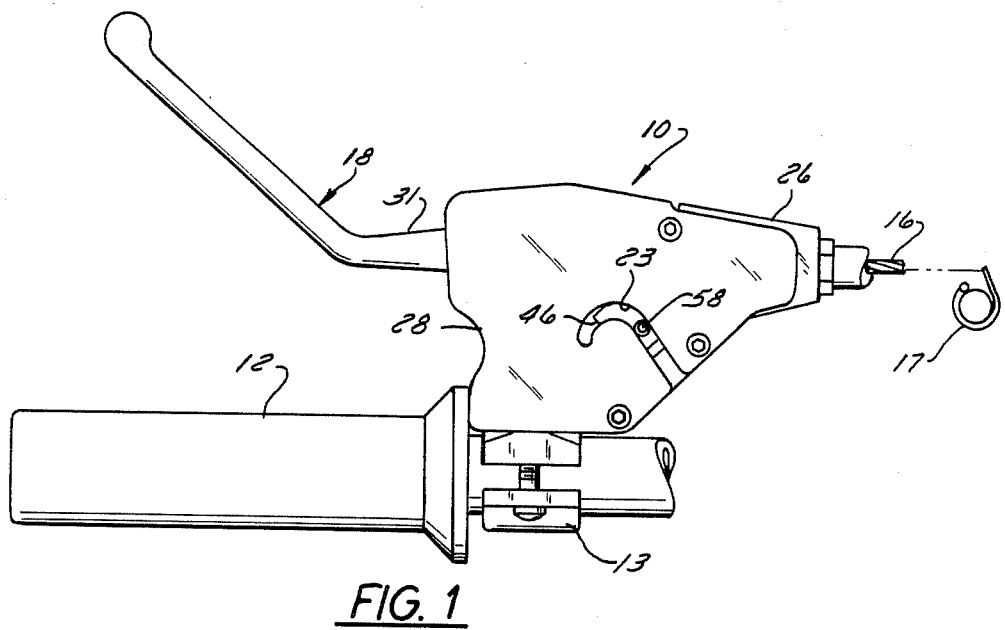
FIG. 1 is a side elevation view of the lever operated brake actuator according to the present invention.

Although only one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Figure 7:
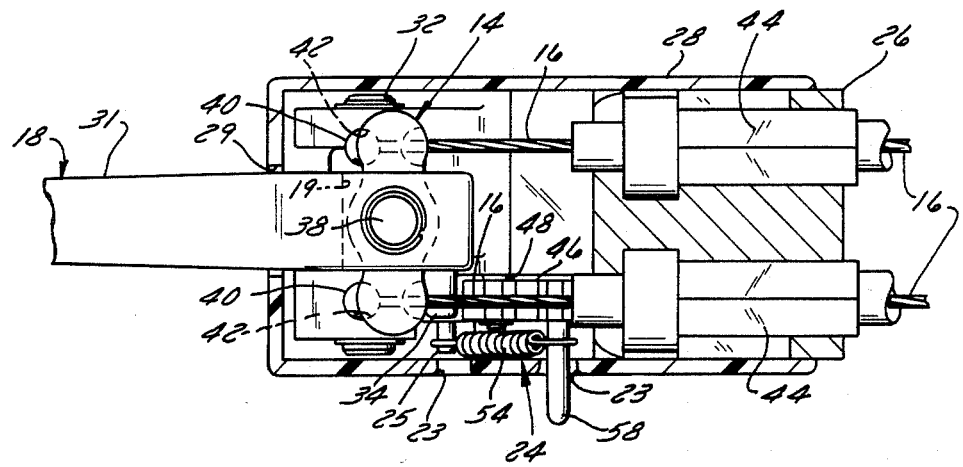
FIG. 7 is a top view of the housing with the cover removed to show the handle in the locked position.
Figure 8:
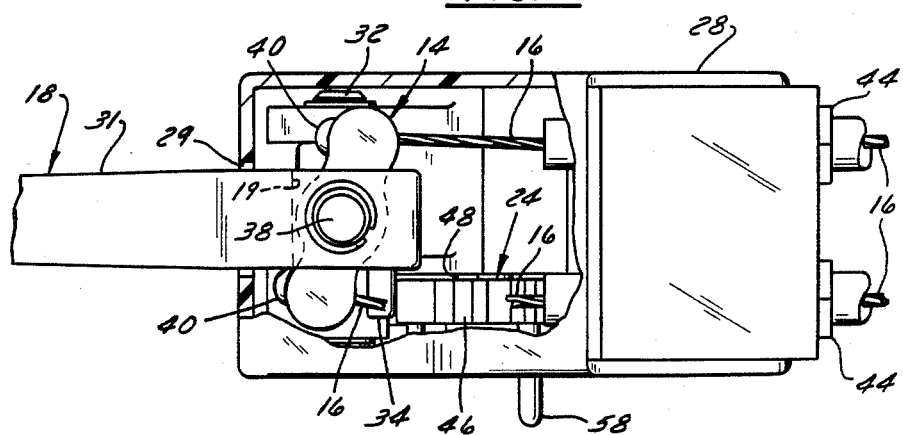
FIG. 8 is a top view of the invention similar to FIG. 7 showing the position of the cable equalizer with one cable broken.

Referring to FIG. 1 of the drawings, the hand-operated brake actuator 10 is shown mounted on the handle bar 12 of an all terrain vehicle (ATV) by means of a clamp 13. The brake cables 16 are shown schematically connected to a brake housing 17 at one end and to a cable equalizer 14, FIG. 2, at the other end. The equalizer 14 is pivotally mounted in a slot 19 in the arm 18 as seen in FIGS. 7 and 8. It should be noted that the brake cables 16 are each connected to a separate brake on the rear wheels of the ATV. In a five-wheel type, all-terrain vehicle as contemplated herein, the brake cables 16 are connected to the brakes on the rear wheels of the vehicle.

Figure 2:
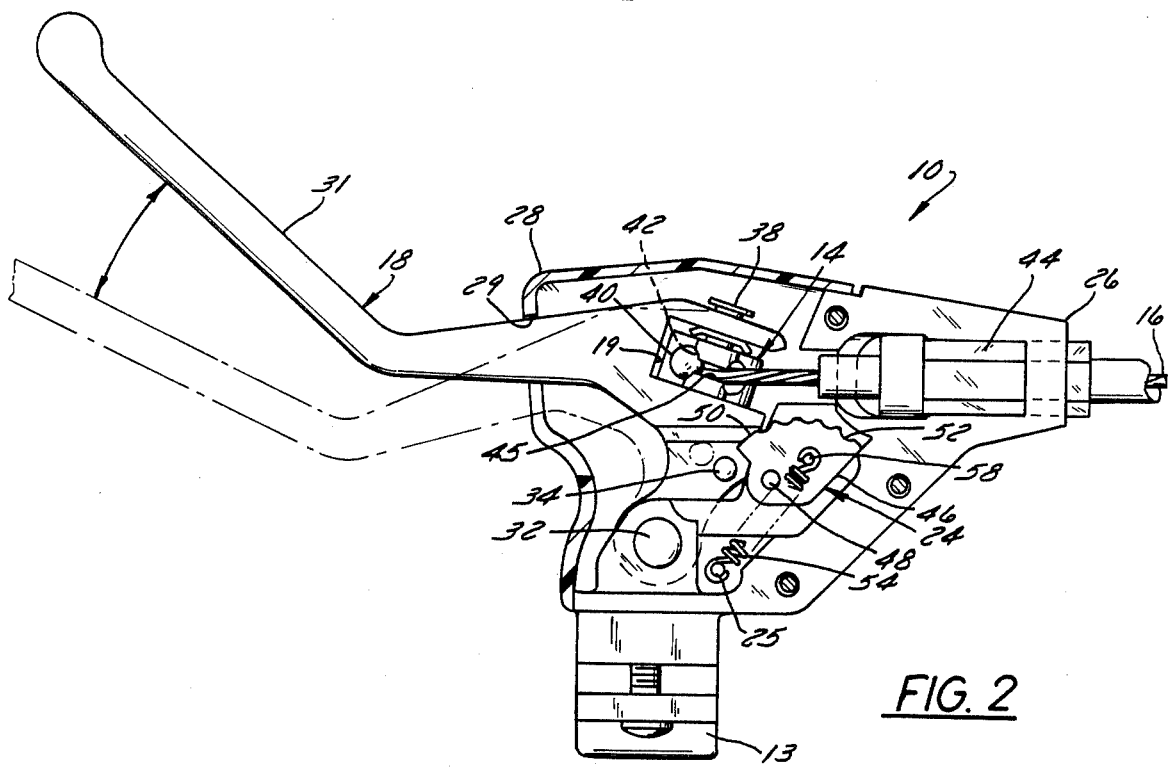
FIG. 2 is a side elevation view of the brake actuator partly in section showing the lever arm in the unlocked or release position.
Figure 6:
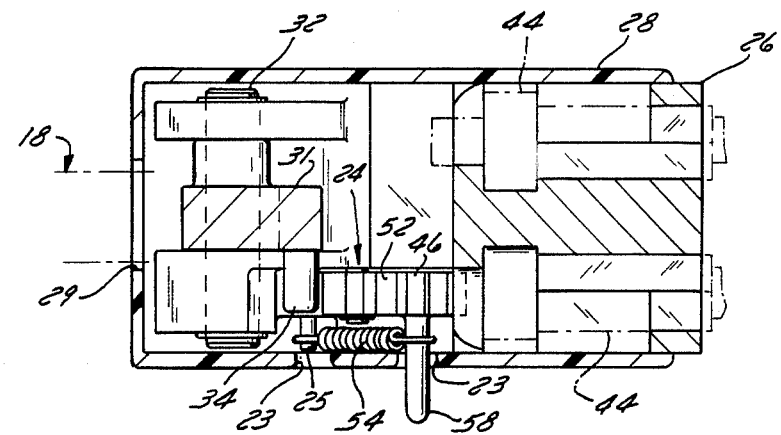
FIG. 6 is a top view partly in section showing a portion of the actuator.

Referring to FIGS. 2, 3 and 4, the hand-operated brake actuator 10 includes a housing 26 enclosed by means of a cover 28. The lever arm 18 is pivotally mounted on a pin 32 within the housing with the handle 31 of the lever arm 18 extending rearwardly through an opening 29 in the cover 28. A parking brake pin 34 is provided on the lever arm 18.

The cables 16 are secured to the cable equalizer 14, which is pivotally mounted on the lever arm 18 by means of a pin 38. Typically, each cable 16 includes a ball 40 at the end which is seated in a spherical recess 42 provided at the ends of the equalizer. The recesses 42 are located at equal distances from the center of the equalizer. The cable extends through a slot 45 in the equalizer 14 and is passed through a cable guide 44 provided in the housing 26. The brakes are actuated by merely pivoting the lever arm 18 downward toward the handle 12 to pull the cables 16 into the housing 26. Normally, if properly set, the amount of lever movement is relatively constant, but may vary from unit to unit.

If it is desired to lock the lever arm in the locked position, a lock assembly 24 is provided in the housing 26. In this regard, the lock assembly 24 includes a cam segment 46 that is pivotally mounted on a pin 48 provided in the housing 26. The cam segment includes a curved surface 50 having a series of grooves 52 which provide a ratchet type locking surface. The cam segment 46 is pivotally mounted on the pin 48 with each groove 52 located at a greater distance from the pivot pin 48 through a quarter of a turn so that the lever arm 18 is progressively locked at greater distances to increase the tension on the brake cables 16.

Means are provided for biasing the cam segment 46 in either the locked or unlocked position. Such means is in the form of a spring 54 which is attached at one end to a pin 25 in the housing 26 and at the other end to a pin 58 provided on the cam segment 46. Referring to FIG. 2, it should be noted that the spring 54 biases the segment 46 to the unlocked position within the housing 24. When it is desired to actuate and lock the brakes, the lever arm 18 is pivoted toward the handle 12. The pin 58 is then moved through the groove 23 in cover 28 far enough to move the spring 54 past the pivot pin 48. The spring 54 then will bias the cam segment 46 against the pin 34 on the lever arm 18.

Referring to FIG. 3, it will be noted that the lever arm 18 has been locked in position in the first groove in the segment 46. If the lever is then pushed down to increase the brake pressure, the spring 54 will pivot the cam segment 48 so that each successive groove 52 engages the pin 34 as it is moved rearward. It should be noted that the lever arm 18 is normally moved through a small distance in order to set the brakes. If the brakes are set with the pin in the first groove 52, there isn't any necessity to increase the pressure. In the event somebody accidentally pushes down on the lever arm 18, the pin 34 will move further rearward, the cam segment 46 will also pivot about pin 48 so that each successive groove 52 engages the pin 34.

Means are provided to maintain tension on one of the brakes in the event one of the cables 16 breaks. Such means is in the form of the cable equalizer 14 which is positioned in the slot 19 in the lever arm 18. In the normal operation, the cable equalizer is free to pivot to compensate for small variations in cable tension to equalize the force applied to the brakes. If one of the cables 16 breaks as shown in FIG. 8, means are provided to limit the motion of the equalizer 14 on pin 38. Such means is in the form of the back wall of slot 19. The amount of pivotal motion in the equalizer 14 to engage the back wall of the slot 19 is limited to less than twenty degrees. The tension in the unbroken cable 16 can be restored by pivoting lever arm 18 toward the handle 12. There will be sufficient movement in the lever arm to compensate for the pivotal motion of the equalizer 14 when the cable breaks to maintain the brake cable under tension. This assures that there will be some brake force on one of the vehicle wheels even if one cable breaks.

Various other features and advantages of the invention are set forth in the following claims.

We claim:

1. A brake actuator for the brakes of a vehicle comprising
   a housing adapted to be mounted on a handle bar,
   a lever arm pivotally mounted on said housing,
   means on said lever arm for connecting said lever arm to the brake cables for the wheel brakes,
   cam means pivotally mounted on said housing for movement between locked and unlocked positions with respect to said lever arm, and over center spring means for biasing said cam means toward the locked position, whereby said lever arm is blocked in the locked and unlocked position to maintain the brakes in the set position.

2. The brake actuator according to claim 1 wherein said cam means includes a ratchet on one side and said lever arm includes a pin positioned to engage said ratchet whereby said pin on engagement with said ratchet will lock said lever arm in position.

3. The actuator according to claim 2 wherein said cam means comprises a cam segment pivotally mounted on said housing, said segment including a cam surface which is located at a progressively greater distance from the pivot axis of the segment, said ratchet being located on said cam surface whereby the tension of the brake cables can be maintained by locking said lever arm at different positions.

4. The actuator according to claims 1, 2 or 3, wherein said connecting means comprises a cable equalizer pivotally mounted on said lever arm, said cables being connected to said equalizer at equal distances from the center of the equalizer.

5. The actuator according to claim 4 including means for limiting the pivotal movement of said equalizer whereby tension can be maintained on one cable if the cable breaks.

6. A hand-operated brake actuator for the rear wheel brakes of a vehicle, said actuator comprising a housing adapted to be mounted on the handle bar of the vehicle,
   a lever arm pivotally mounted on said housing,
   means for connecting said lever arm to the brake cables for the wheel brakes of the vehicle,
   a cam segment pivotally mounted on said housing for movement between locked and unlocked positions with respect to said lever arm, and means on said cam segment for blocking the movement of the lever arm when pivoted to the locked position, said blocking means comprising a curved surface on said cam segment having a series of grooves forming a ratchet, said grooves being located at progressively greater distances from the pivot axis of said segment to compensate for variations in the length of the brake wheel cables.

7. The brake actuator according to claim 6, including spring means for biasing said segment toward the locked and unlocked positions.

8. The brake actuator according to claims 6 or 7, wherein said connecting means includes a cable equalizer pivotally mounted on said lever arm and having a brake cable connected to each end of the equalizer at equal distances from the center of the equalizer.

9. The brake actuator according to claim 8 including means for limiting the pivotal motion of the equalizer on the lever arm whereby the tension on one of the brake cables can be maintained if one of the brake cables breaks.

* * * * *